W. W. LOWE.
PLANTER.
APPLICATION FILED JULY 26, 1911.
1,038,611.
Patented Sept. 17, 1912.
2 SHEETS—SHEET 1.
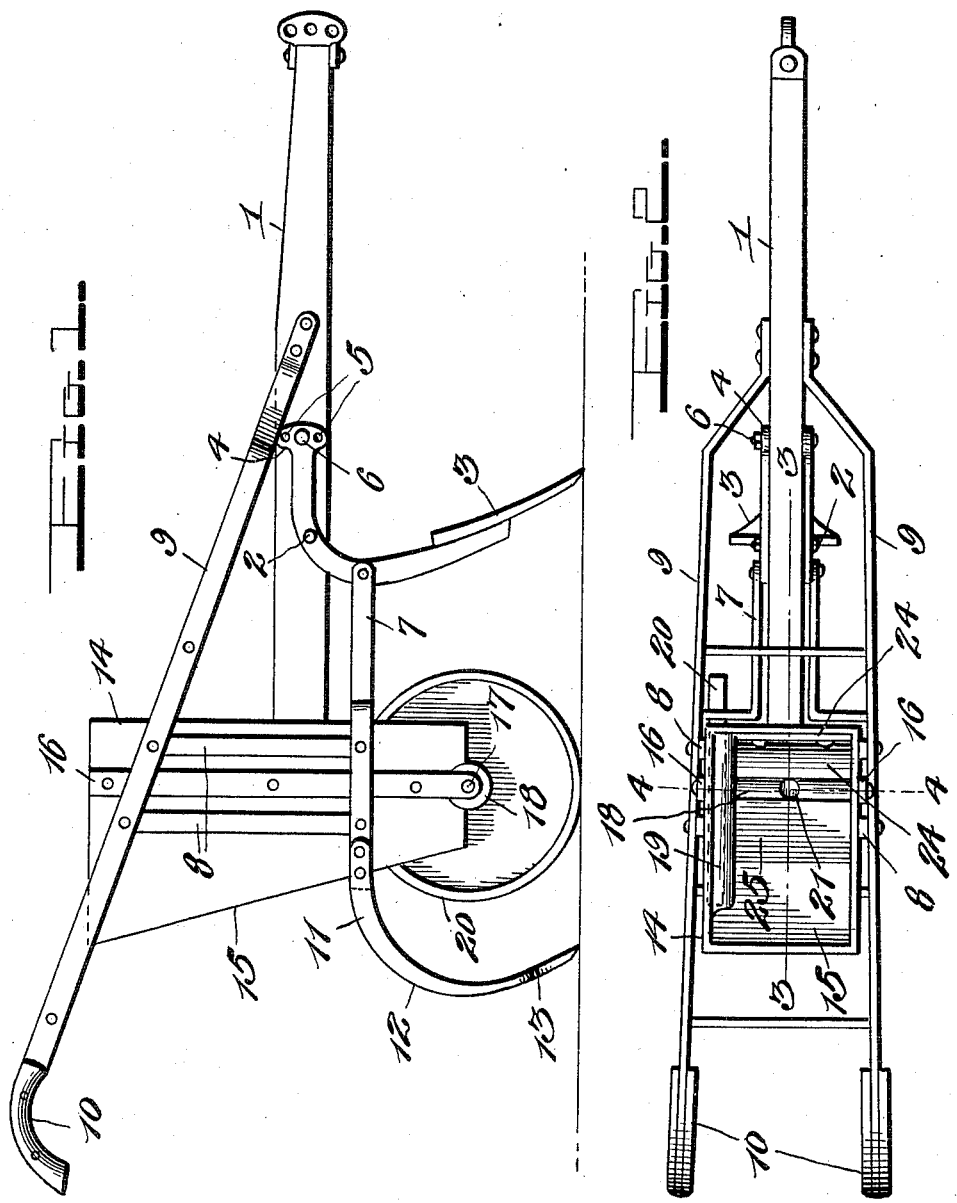
Witnesses
Inventor
Wallace W. Lowe,
By Watson E. Coleman.
Attorney W. W. LOWE.
PLANTER.
APPLICATION FILED JULY 26, 1911.
1,038,611.
Patented Sept. 17, 1912.
2 SHEETS—SHEET 2.
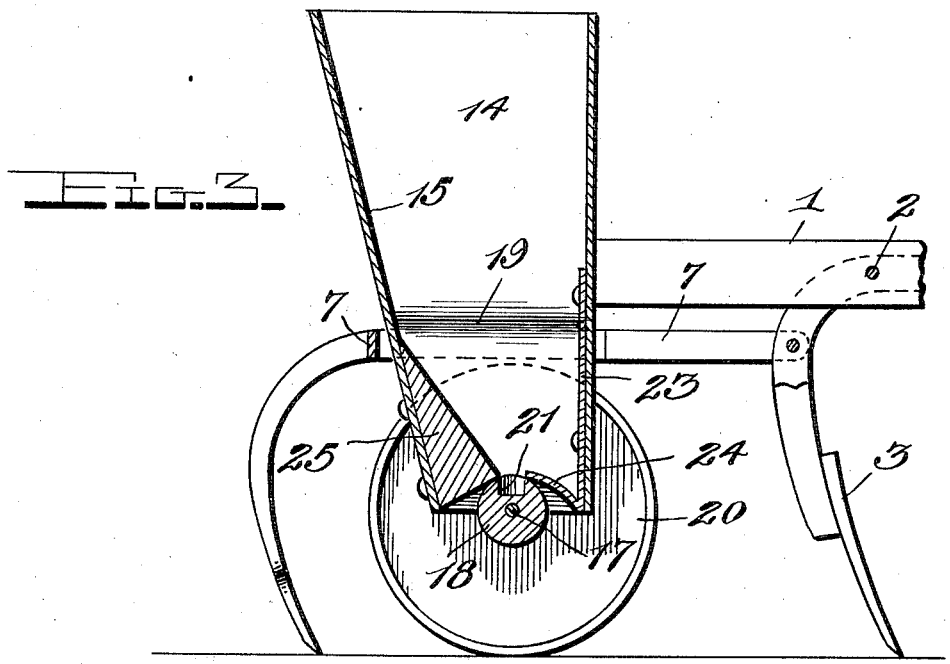
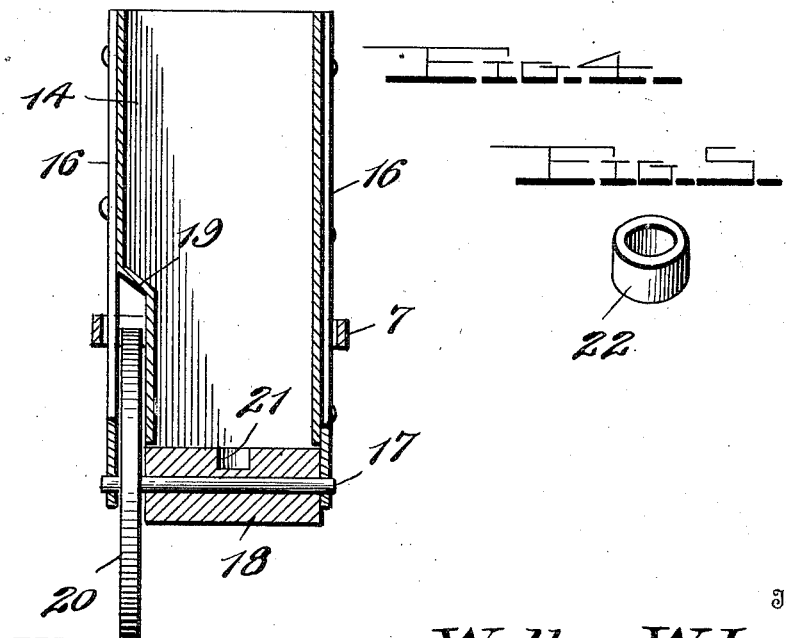
Inventor
Wallace W. Lowe,
By Watson E. Coleman,
Attorney
Witnesses
Chas. L. Griesbauer.
Herbert J. Jacobi.

UNITED STATES PATENT OFFICE.

WALLACE W. LOWE, OF BYRON, GEORGIA.

PLANTER.

1,038,611.  Specification of Letters Patent.  Patented Sept. 17, 1912.

Application filed July 26, 1911. Serial No. 640,601.

*To all whom it may concern:*

Be it known that I, WALLACE W. LOWE, a citizen of the United States, residing at Byron, in the county of Houston and State of Georgia, have invented certain new and useful Improvements in Planters, of which the following is a specification, reference being had to the accompanying drawings.

This invention comprehends certain new and useful improvements in seeders and planters, and it has for its primary object a simple and efficient agricultural implement of this character, the framework of which is so constructed and arranged that the hopper for the seeds may follow the inequalities of the ground, without regard to the depth at which the furrow opening blade is working, all irregularities of the ground being thereby compensated for.
With this and other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device. Fig. 2 is a top plan view thereof. Fig. 3 is a vertical longitudinal section through the device as seen on line 3—3, Fig. 2. Fig. 4 is a vertical transverse section as seen on line 4—4, Fig. 2, and, Fig. 5 is a perspective view of one of the stopper members used for the reducing of the size of the seed-dropping opening in the dropping cylinder.

In carrying out my invention, I shall refer to the drawings in which similar reference characters designate corresponding parts throughout the several views and in which—

1 indicates a beam of the usual or any preferred type used in agricultural implements of this type, said beam having pivoted thereto adjacent its rear end, as shown at 2, the standards of an opening plow 3, and the free ends of the standards of said plow are enlarged, as shown at 4, and provided with a plurality of openings 5. These openings are arranged in arcuate alinement about the pivot 2 as a center and are adapted to receive a bolt 6 passing through the beam 1, upon the threaded end of which bolt is engaged a nut, and it will be seen that said plow may be disposed at various angles with respect to the ground and the beam by changing the position of the bolt 6 so as to extend through a different opening 5. Secured to said standards of the plow 3 below its pivotal point 2, are the forwardly projecting arms or extensions of a metallic frame 7, which frame is substantially rectangular in design and disposed below and partly beyond the rear end of the beam 1. Secured to each of the side bars of said frame, are the lower ends of a pair of vertically extending bars 8, the bars in each pair being spaced from one another and each pair of bars being in substantial parallel relation with one another, and the upper ends of said bars are secured to the arms 9 which extend upwardly and outwardly from opposite sides of the beam 1 to form the handle members 10 for the device. These arms 8, it will be seen, form bracing members for the handle members and any other desired bracing means may also be provided, if desired. Also secured to the side bars of the frame 7, are the spring standards 11 which are bent adjacent their ends, as shown at 12, and provided on their free ends with the small covering plows 13.

Loosely mounted in the frame 7 and guided within the vertical bars 8 on the side bars of the frame 7 and the arms 9, is a hopper 14, said hopper having its rear wall inclined inwardly from its upper to its lower end, as shown at 15, whereby the downward movement of said hopper within the frame 7 may be limited. Mounted on each of the side faces of the hopper 14 is a vertical strip or bar 16, each of which extends to a point substantially at the lower ends of the sides of said hopper, and rotatably mounted in the lower ends of said strips or bars 16, is a shaft or axle 17, said shaft having keyed or otherwise removably secured thereto, a cylinder 18, which cylinder is of a width substantially the same as the length of the lower portion of the hopper 14. The one side wall of the hopper 14, as shown in Fig. 4, is offset, as shown at 19, thereby slightly reducing the area of the hopper at the bottom thereof, and mounted on said axle or shaft 17 between the wall which is offset and the outer vertical strip 16 secured to said wall, is a supporting and driving wheel 20, said wheel being so mounted on the axle 17 as to rotate the latter when said wheel is rotated and in position to be readily removed when desired.

As stated, the cylinder 18 is keyed on the shaft 17 or otherwise removably mounted thereon, and said cylinder is provided in the periphery thereof about midway of its ends, with a recess 21, said opening being preferably circular in cross section and of any desired size in proportion to the size of said cylinder, whereby when said cylinder 18 is rotated with the rotation of the axle or shaft 17, the opening 21 will receive the contents of the hopper 14 to drop the same on the ground over which the device is traveling. In order to decrease the diameter of the opening 21 so as to allow a lesser amount of seed or the like to be dropped at each complete rotation of the cylinder 18, I have provided a sleeve member or bushing 22 which is adapted to be entered within the opening 21 and fit snugly therein. When such a sleeve member has been properly positioned within the opening, the effective diameter of said opening will be correspondingly reduced, and should it be desired to reduce the opening still more, additional bushings of smaller bore may be provided and applied in the same manner to accomplish the result desired. In forming this hopper 14, I do not provide the usual flat bottom with an opening therein for the insertion therethrough of a feed-dropping mechanism, but provide an improved bottom which comprises a metallic plate 23 riveted or otherwise secured to the inner face of the front wall of the hopper, and said plate extends the full width thereof, being bent at its lower end, as shown at 24, to extend partially over the cylinder 18 to form a shield or the like therefor. This bent portion 24, therefore, forms a partial bottom for the hopper and I have also provided an additional means for the completion of the bottom thereof, and to this extent, I provide a strip 25 which is secured to the inner face of the rear wall of said hopper adjacent its lower end, said strip having the face thereof which rests against the wall of the hopper, flat, while the opposite or outer face thereof is inclined or beveled at two angles to form a double inclined face, the intersection of the faces being contiguous to the cylinder 18 and in the same horizontal plane as the highest peripheral point of the cylinder 18. As stated, the member 25 is a strip extending the full width of the rear wall of the hopper, but if desired, the same may be formed integral therewith, and it will be seen that when positioned, as described, the lower of the two inclined faces is disposed in such close relation to the cylinder, that the same may be said to be substantially tangent thereto. By so forming the bottom of the hopper in this manner, the usual wasting of the seed from the hopper by escape thereof between the crevices formed between the seed-dropping mechanisms and the bottom of the hopper, will be obviated. It will further be appreciated that should it be possible for any of the seed to have gained entrance to the small space formed between the one face of the member 25 and the outer periphery of the cylinder 18, the same will be prevented from dropping therethrough upon the turning of the cylinder in the forward direction.

In operation, the hopper is filled with seed or any other material, to be dropped in rows, and draft applied to the beam 1, whereupon the operator grasps the handles 10 to steady the device, and at the same time, retains the reins of the animals propelling the same. As the device is driven forwardly, the plow 3 will open the ground, accordingly as the same is adjusted and the wheel 20 will be rotated to correspondingly rotate the axle 17 and cylinder 18. As the cylinder rotates, the recess 21 therein will receive a limited and predetermined amount of seed from within said hopper to drop and distribute the same in the furrow formed by the opening plow 3, and the covering plows 13 which extend a short distance to the rear of the hopper will cover said seed after the same has been dropped in the furrow. During the operation of the device, it will be appreciated that considerable rough ground will be met and ofttimes large stones and other obstructions found to obstruct the path of the device, and in order to allow the device to move over these rough portions of ground and the obstructions which may be met, without affecting the beam and the adjunctive parts thereon, I have loosely mounted the hopper 14 carrying the supporting and driving wheel thereon, within the frame 7 which is indirectly carried on said beam 1. Thus, the supporting and driving wheel 20 and the hopper 14 may readily yield and adjust themselves to the irregularities of the ground without affecting the other parts of the device, and it will be seen that in the vertical movement of the hopper, the same is guided within the frame-work formed by the frame 7, the bars 8 and the arms 9. Should it be desired at any time during the operation of the device to decrease the amount of seed which is being deposited at each complete rotation of the cylinder, the sleeve 22 may be entered in the opening 21 of said cylinder to reduce the diameter of the recess, and furthermore, should it be desired to vary the distance between the points where the seed is being deposited, the wheel 20, of the size shown in the drawings may be removed and another wheel of larger or smaller size substituted therefor, it being understood that the offset portion 19 in the side of said hopper is provided at a sufficient distance above the bottom thereof to accommodate the various sized wheels.

Having thus described the invention what is claimed is:—

1. A planter of the character described, including a draft beam, plow supporting standards pivotally connected to said beam for angular adjustment thereon, means for holding said standards in different adjusted positions relative to the beam, a furrow opening plow carried by said standards, a hopper supporting frame embodying side bars which are formed with forward extensions pivotally connected to the standards, a wheel supported hopper vertically movable in said frame, the frame being provided, in connection with the hopper, with means for limiting the free downward movement of the hopper in the frame, and handles connected to the beam and extending rearwardly and upwardly therefrom and operatively connected to the frame.

2. A planter of the character described, including a draft beam, standards pivotally connected to said beam for angular adjustment thereon, means for holding said standards in adjusted positions on the beam, a furrow opening plow carried by said standards, handles connected to said beam and extending rearwardly therefrom, a hopper supporting frame embodying side bars which are formed with forward extensions pivotally connected to the standards below the pivotal point of the latter, vertical bars secured at their lower ends to the side bars of the frame and at their upper ends to the handles, and a wheel supported hopper mounted in said frame and vertically movable therein.

In testimony whereof I hereunto affix my signature in the presence of two witnesses.

WALLACE W. LOWE.

Witnesses:
HERBERT J. JACOBI,
CHARLES M. BIRCKHEAD.

Copies of this patent may be obtained for five cents each, by addressing the "Commissioner of Patents, Washington, D. C."